March 25, 1969     M. F. SMITH ET AL     3,434,698
FLUID MIXING, MOVING AND ATOMIZING METHODS AND APPARATUS
Filed Sept. 19, 1966     Sheet 1 of 3
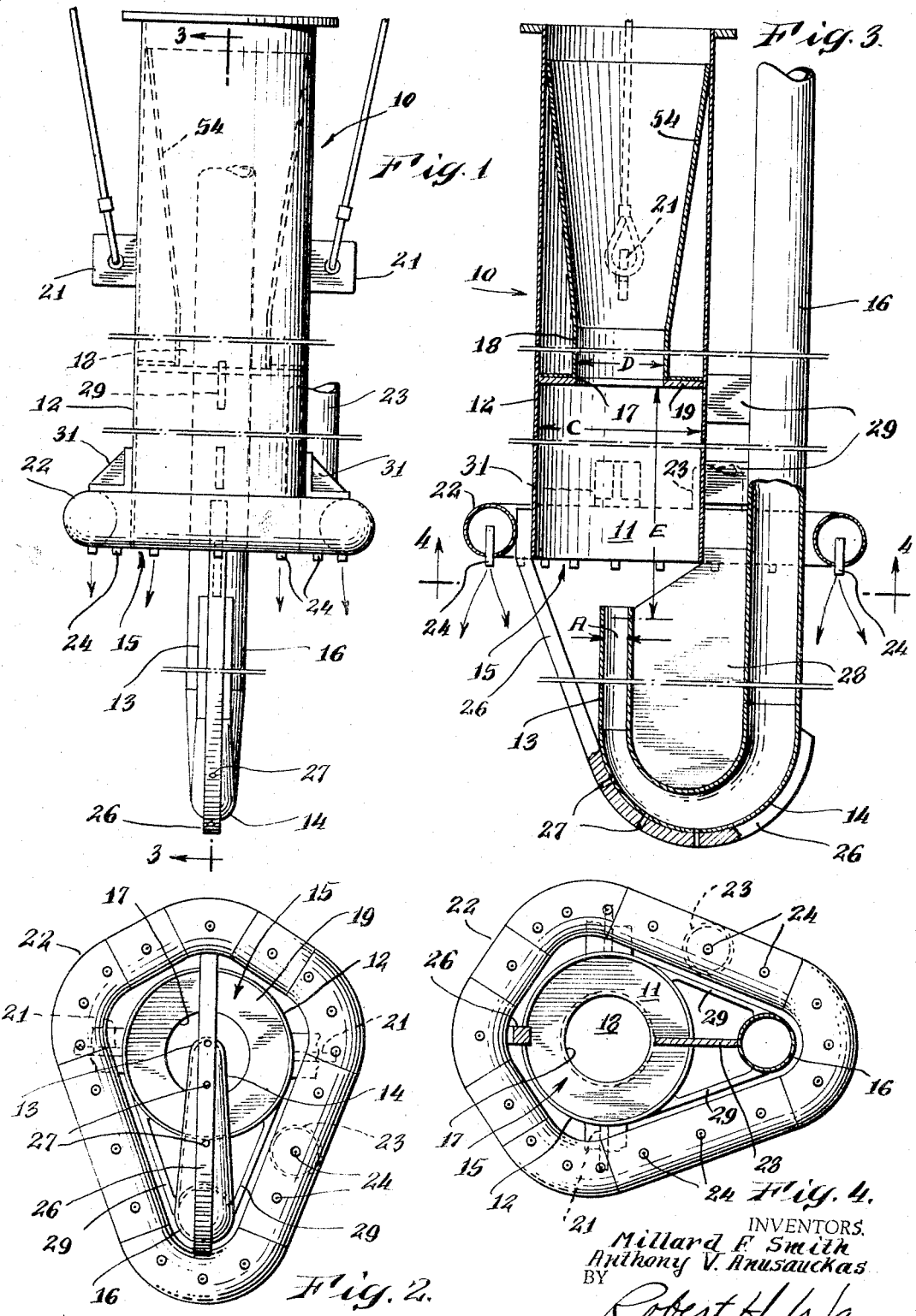
INVENTORS.
Millard F. Smith
Anthony V. Anusauckas
BY Robert H. Ware
ATTORNEY.

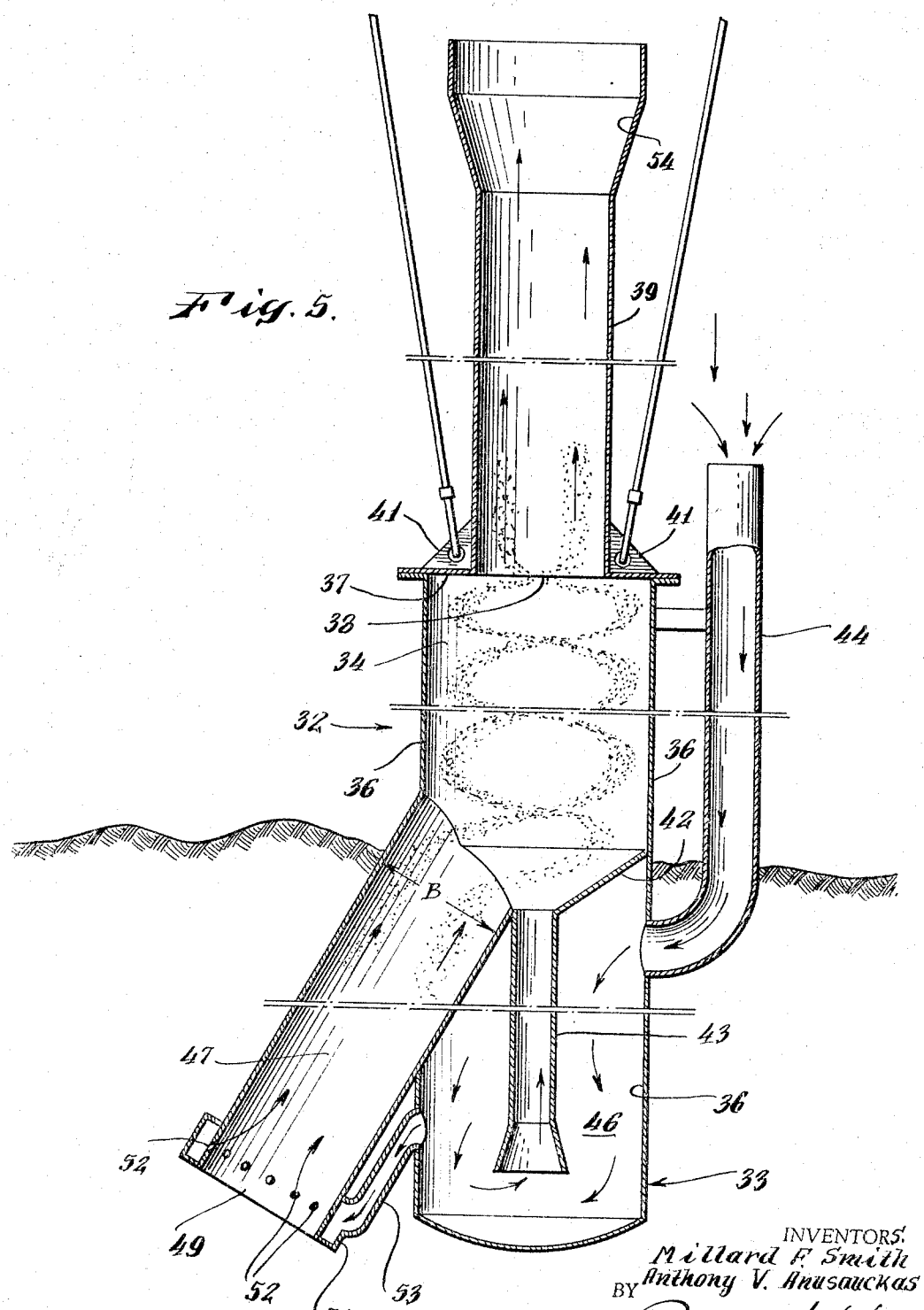

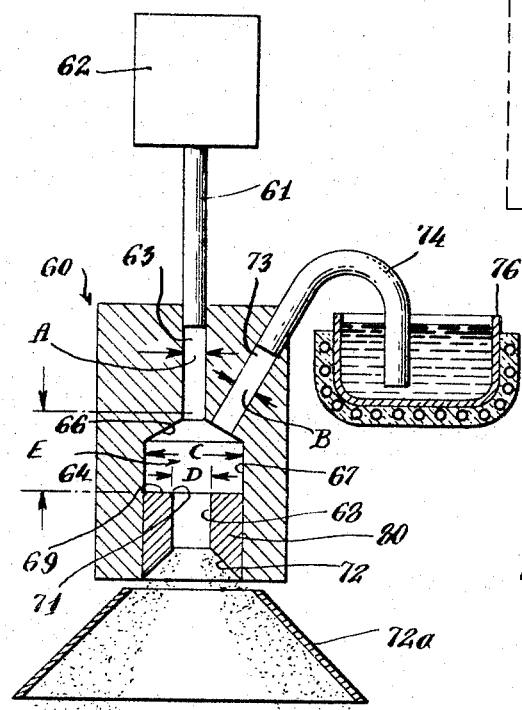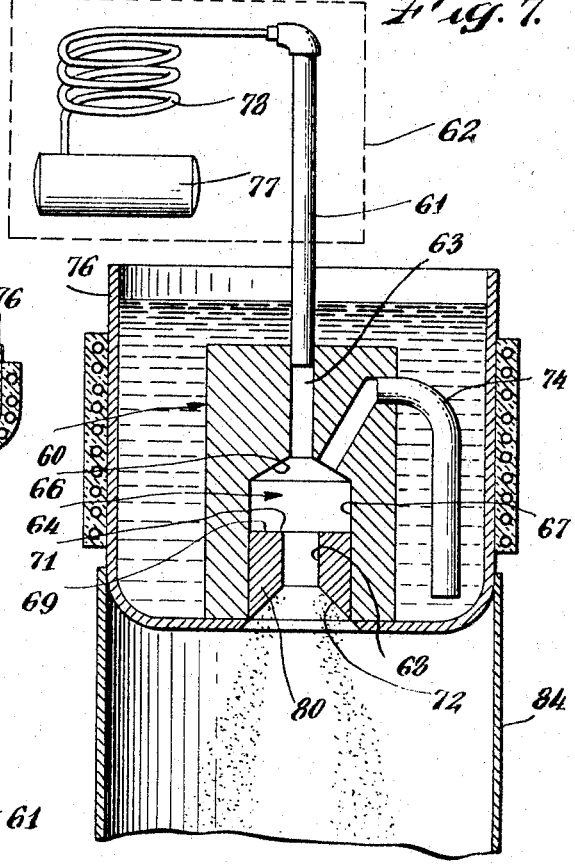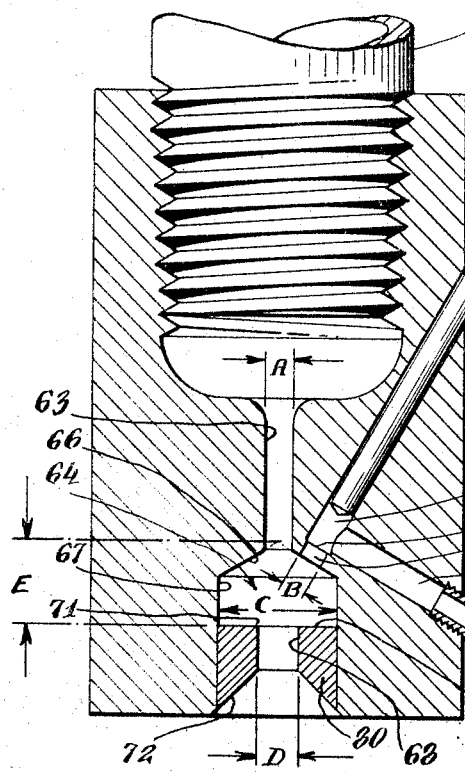

United States Patent Office 3,434,698
Patented Mar. 25, 1969

3,434,698
FLUID MIXING, MOVING AND ATOMIZING
METHODS AND APPARATUS
Millard F. Smith, Westport, Conn. (P.O. Box 295, Saugatuck, Conn. 06880), and Anthony V. Anusauckas, Bridgeport, Conn.; said Anusauckas assignor to said Smith
Continuation-in-part of application Ser. No. 319,418, Oct. 28, 1963. This application Sept. 19, 1966, Ser. No. 580,394
The portion of the term of patent subsequent to Aug. 8, 1984, has been disclaimed
Int. Cl. B01f 15/02, 5/02
U.S. Cl. 259—4                                    18 Claims

ABSTRACT OF THE DISCLOSURE

Methods and apparatus for mixing, aspirating and atomizing fluids or immersed granular materials for use in dredging and grain-moving operations, atomizing of molten metals or like operations, employing a stream of supply fluid projected into an enlarged mixing chamber having an intake portal exposed to an intake fluid, with an outlet portal of relatively small cross-sectional area joined to the mixing chamber at a point of abrupt reduction in diameter of the fluid stream passing therethrough.

---

This application is a continuation-in-part of copending application Ser. No. 319,418, filed Oct. 28, 1963, which issued to the applicants as United States Patent 3,334,657 on Aug. 8, 1967.

This invention relates to the mixing, moving and atomizing of fluids, and particularly to unique methods and apparatus for mixing one fluid in another, for moving fragmented, granular, pulverized and powdered materials, and for atomozing one or more liquids in finely divided droplet form.

The methods and apparatus of this invention for moving fragmented, granular, pulverized and powdered materials relate particularly to the structure and utilization of intake heads designed to be immersed in a mass of such materials as sand, clay or mud to be dredged from the sea bottom; corn, oats, wheat or other grain to be removed from the cargo hold of a vessel; chopped or fragmented scrap metal pieces of irregular size; chopped, extruded "pelletized" plastic materials; or any like granular or pulverized material to be delivered from one point to another.

The atomizing techniques of this invention are useful in atomizing fuels for liquid fuel burners and carburetors, and for producing finely divided droplets and solidified particles of metals, metallic oxides and metallic mixtures or eutectic compositions by atomizing fluid materials. Molten metals can be atomized by these techniques while they are maintained at temperatures above their melting points, and by allowing these finely divided atomized liquid materials to solidify at predetermined temperatures and pressures, their composition and particles size can be controlled with precision.

In the field of fuel burners and carburetors, many different forms of atomizing devices have been proposed and employed with varying degrees of success. In the field of atomizing molten metals by "acoustical" means, experimental work has been carried on in Japan, Sweden and the United States. However, a commercially successful molten metal atomizing technique without moving parts has never been introduced and used commercially prior to the present invention, with the possible exception of a complex Swedish technique for atomizing molten lead with highly critical geometry which has never been successful for continuous use with metals of higher melting points.

In one of these suggested prior atomizing techniques, a stream of molten metal is directed along a converging conical-helical path with increasing angular velocity until the stream shatters into small droplets. Other prior proposed techniques have employed ricocheting or bouncing streams of spattering molten metal, in which particle size control has been very poor, except with lead. These prior techniques have produced metallic particles of widely varying size and shape, and have not proved suitable for commercial applications.

The atomizing methods and apparatus of the present invention permit close control of droplet and solidified particle size and shape, providing excellent quality control combined with economical commercial production of finely divided or powdered metals, alloys and oxides or other compounds. Smooth, even distribution of the atomized liquid material facilitates the application of uniform coatings of metals or compounds to various substrates, such as plastic films, paper, glass, metal or other materials.

The atomozing techniques of this invention employ a sonic injector device using the forward momentum of a stream of pressure fluid, which may be a gas such as air, steam, or nitrogen or a molten metal or other liquid, to draw into itself a second stream of molten metal or other liquid from a reservoir. These streams combine in an enlarged mixing chamber, where their velocities are sharply arrested at a region of substantial enlargement of the effective cross-sectional area defined by the enclosing, bounding surfaces. The merged streams of fluids are then directed past a shoulder forming a restriction reducing the cross-sectional area defined by the bounding surfaces, causing a velocity increase in the advancing mixed fluid stream leaving the mixing chamber.

Many conventional methods and apparatus for setting in motion a stream of pulverized or granular materials are inefficient and expensive. Many of such prior devices are essentially Venturi tubes using the principle known as the Bernoulli effect, relaying on the negative pressure or a partial vacuum created by acceleration of an advancing stream of fluid to draw into itself a second stream of material to be moved. Other such devices employ feed hoppers which merely dump material into an advancing fluid stream for delivery from one point to the next. These prior devices generally exhibit high friction losses and require large power consumption to move even low volumes of materials.

In the fluid moving methods and apparatus of this invention, the opposite of this Venturi acceleration effect is apparently achieved. We have discovered that the advancing supply fluid stream can be decelerated in our enlarged mixing chamber, which is exposed either through a large intake port or through an intake conduit to a source of intake fluid, in this case the granular or pulverized material to be moved together with its surrounding gas or liquid.

The advancing stream of supply fluid is directed into this mixing chamber toward an opposite outlet conduit, preferably characterized by an abrupt constriction of the effective cross-sectional area of the advancing stream at a perpendicular exit surface joining the maximum peripheral diameter of the mixing chamber with the entrance portal of the exhaust conduit.

These three features of the methods and apparatus of this invention—the supply conduit, the enlarged mixing chamber, and the reduced outlet conduit defining at its intersection with the exit surface a peripheral constriction shoulder terminating the mixing chamber—may be provided in various configurations and sizes for different atomizing, aspirating or materials handling operations.

The theory of operation of these devices is not fully understood, but it appears that the retarding deceleration in the stream of supply fluid entering the mixing chamber, in cooperation with its later acceleration as it enters the outlet conduit, create standing wave phenomena with two or more principal frequencies, which may be subsonic, sonic or supersonic. Furthermore, these standing wave phenomena in many cases apparently induce a continuous path of movement for the stream progressing through the mixing chamber in a helical configuration, producing unusually effective mixing and suspending of the intake fluid stream throughout the supply fluid stream. In fluid streams advancing through prototype mixing chambers formed in blocks of transparent plastic material, helical or vortex flow patterns have been observed which are believed to contribute to the effectiveness of these devices in many cases.

The resulting standing waves thus are apparently responsible for the thorough mixing and excellent reduction in diameter of the resulting fluid droplets created by these atomizing techniques, and for the thorough fluid mixing and successful aspirating and moving of fluids and suspended granular materials achieved by this invention.

Accordingly, a principal object of the present invention is to provide methods and apparatus capable of mixing and moving a continuous supply of pulverized, powdered, granular or fragmented intake material in an advancing supply fluid stream.

Another object of the invention is to provide such methods and apparatus which are capable of moving large quantities of such intake materials from point to point with low power consumption.

A further object of the invention is to provide such methods and apparatus for economical dredging of mud, silt, sand or clay from the sea bottom.

Another object of the invention is to provide such methods and apparatus for economical moving of granular materials from point to point in a stream of compressed air or other gas.

Another principal object of the present invention is to provide economical fluid mixing, moving and atomizing methods and apparatus operating with high effectiveness and good controlability.

Another object of the invention is to provide such liquid atomizing methods and apparatus which are well adapted to convert molten liquid metal into finely divided metal powder.

A further object of the invention is to provide such methods and apparatus which are suitable for converting separate molten liquid metals into solidified powdered mixtures of those metals.

Another object of the invention is to provide such methods and apparatus suitable for producing finely divided powdered metallic oxides and other compounds.

A further object of the invention is to provide such methods and apparatus which are well adapted to the atomizing of liquid fuels in carburetors and fuel burners.

Other and more specific objects will be apparent from the features, elements, combinations and operating procedures disclosed in the following detailed description and shown in the drawings, in which:

FIGURE 1 is a front elevation view of an intake head of the present invention;

FIGURE 2 is a bottom plan view of the intake head shown in FIGURE 1;

FIGURE 3 is a sectional side elevation view of the same intake head, taken along the line 3—3 in FIGURE 2;

FIGURE 4 is a cross-sectional plan view of the same intake head, taken along the line 4—4 in FIGURE 3; and, FIGURE 5 is a sectional side elevation view corresponding with that of FIGURE 3 showing a different embodiment of an intake head according to the present invention.

FIGURE 6 is a schematic flow diagram showing apparatus useful in performing the liquid atomizing and mixing methods of the present invention.

FIGURE 7 is a modified schematic flow diagram showing a different apparatus embodiment useful in performing a modified atomizing method embodying the present invention, and FIGURE 8 is an enlarged sectional side elevation view of the converging passages and mixing chamber incorporated in a third embodiment of the apparatus of this invention.

Fluid moving intake head configurations

The intake devices which have proved suitable for performing the fluid moving and mixing method of this invention incorporate a substantially cylindrical mixing chamber through which passes a supply fluid stream moving from a supply conduit to an outlet conduit. Thus, the intake head 10 shown in FIGURES 1–4 incorporates a generally cylindrical mixing chamber 11 having an effective cross-sectional diameter C and bounded by the outer peripheral walls 12, and an effective length E, both as shown in FIGURE 3.

In the embodiment shown in FIGURES 1–4, the lower intake portal end 15 of mixing chamber 11 is substantially open and exposed to the space surrounding the intake head 10, being obstructed only by a supply conduit 13 substantially coaxial with the mixing chamber 11 and having a considerably smaller diameter, with its open ended supply portal facing the open intake portal end 15 of mixing chamber 11.

The supply conduit 13 is connected through a U-shaped base conduit 14 to an external pressure conduit 16 which extends alongside and substantially parallel to the mixing chamber 11 defined by the peripheral walls 12. The supply portal end of supply conduit 13 facing the intake portal end 15 of mixing chamber 11 is aligned concentrically to face the outlet portal 17 of an outlet conduit 18 concentrically aligned within the exterior casing formed by peripheral walls 12 of intake head 10, and having an internal diameter D. The upper or exit end of mixing chamber 11 is bounded by an exit wall 19 extending in a substantially transverse plane joining the inside of the peripheral walls 12 to the outlet conduit 18 at the outlet portal 17.

For heavy duty operation in the pumping of grain, sand, mud, gravel or fluids, the intake head 10 shown in the drawings may be formed in any suitable size, and in one instance the diameter A of the supply conduit 13 was two inches, diameter C of mixing chamber 11 was twelve inches, length E of mixing chamber 11 was about twenty inches, and diameter D of outlet conduit 18 was eight inches.

The intake head 10 is preferably supported by suitable chains or cables from an overhead crane or boom capable of lowering the intake head 10 to the desired intake position immersed within a body of granular or pulverized intake material. These supporting cables are anchored to the intake head 10 via lifting ears 21 protruding laterally from the outer surface of peripheral walls 12 near the upper end of the intake head 10.

Surrounding the intake portal 15 forming the open lower end of mixing chamber 11, the preferred embodiments of the intake heads employed in this invention incorporate a jet-cutting head 22 formed as an elongated unsymmetrical hollow ring surrounding both the peripheral walls 12 and the pressure conduit 16. This hollow ring-shaped cutting conduit 22 is supplied with pressurized fluid through a cutting pressure conduit 23, and this pressurized supply fluid is delivered through the ring-shaped jet-cutting head conduit 22 to a plurality of cutting nozzles 24 formed in a spaced array around the lower surface of the cutting head conduit 22. As shown in FIGURES 1 and 3, the nozzles 24 are preferably formed as short lengths of tubing extending through and welded in suitable apertures in the lower surface of the jet-cutting head conduit 22, with substantial portions of their length enclosed inside conduit 22 to provide downward stream direction for the resulting jets issuing from the nozzles 24, to agitate the intake material in the region of intake portal 15.

Additional cutting jets are provided at the lower end of the U-shaped base conduit 14, which is provided with an outer peripheral bumper skid or rib 26 welded to its convix outer periphery. A plurality of bumper jets 27 are formed as small radial passages bored directly through the skid rib 26 and the underlying wall of base conduit 14. Nozzles 24 and bumper jets 27 both have the effect of stirring and agitating the mass of granular intake material to be drawn into mixing chamber 11 through its intake portal 15.

The intake head 10 is well adapted to withstand the shock loading and heavy stresses imposed by its use with heavy and irregular material, since the walls and conduits forming intake head 10 are all preferably formed of heavy steel plate, solidly welded into the configurations illustrated in the drawings and described above.

In addition, the subordinate conduits 13, 14, 16, 22 and 23 are similarly formed of heavy steel pipe and are firmly anchored by welded plates and webs to the peripheral walls 12 within intake head 10.

A gusset web 28 is welded to the inside facing peripheries of the external surfaces of conduits 13, 14 and 16 and to the outer surface of the peripheral walls 12 of the lower intake head 10 to form a solid unitary structure. Additional diagonal webs 29 are preferably welded tangentially to the conduit 16 and peripheral walls 12 at spaced intervals, as indicated in FIGURES 3 and 4, and a plurality of angle brackets 31 are firmly welded spanning the space between jet-cutting head conduit 22 and peripheral walls 12 and conduit 16, thus making the jet-cutting head conduit 22 an integral structural reinforcement for the other conduits and tubular members comprising the intake head 10.

Intake head with intake conduit

In the modified embodiment illustrated in FIGURE 5, a similar intake head 32 is provided with a pressure chamber 33 formed at the lower end of the head 32. In its upper portion, intake head 32 also encloses a mixing chamber 34 bounded by the peripheral walls 36 of intake chamber 33, and the exit wall 37 joining the upper periphery of walls 36 to the outlet portal formed by the facing open end of the outlet conduit 39 anchored by welded apertured angle flanges 41 to the exit wall 37.

Dividing the lower end of the mixing chamber 34 from the pressure chamber 33 in intake head 32 is a conical supply wall 42, whose generatrices are angularly displaced by an included angle of approximately 60 degrees upward or "downstream" from the concentric axis of peripheral walls 36 and exhaust conduit 39.

A supply conduit 43 having an inside diameter considerably smaller than that of mixing chamber 34 has its open supply portal end joined and welded to the rim of a suitable central aperture in the conical supply wall 42. The opposite open end of supply conduit 43 opens within the lower end of pressure chamber 33.

The chamber 33 is supplied with pressure fluid through an external supply conduit 44 extending outside of and substantially parallel to the peripheral wall 36 and providing a suitable connection from a source of pressurized supply fluid to the pressure chamber 33 formed within and bounded by the casing 36 of intake head 32 and the underside of conical supply wall 42.

A diagonal intake conduit 47 passes through and is welded solidly within a suitable aperture in peripheral walls 36, with its inner end forming an open intake portal passing through and peripherally welded to a cutaway intake portal aperture of diameter B formed in conical supply wall 42. The outer end of intake conduit 47 forms an intake port 49 extending diagonally outward into the body of intake material to be drawn into the device. Preferably, as shown in FIGURE 5, the axis of the cylindrical intake conduit 47 is angularly displaced at an angle of about 30 degrees from the concentric axis of conduit 43, mixing chamber 34 and outlet conduit 39, and these axes intersect in the mixing chamber 34. Intake conduit 47 thus converges in the downstream direction relative to the passage of pressure fluid through supply conduit 43, mixing chamber 34 and exhaust conduit 39, making the axis of intake conduit 47 substantially perpendicular to the conical supply wall 42 at the point where intake conduit 47 passes therethrough.

A bumper jet ring 51 formed as a hollow annular chamber surrounds the intake port 49 of intake conduit 47, and the jet ring 51 communicates with the interior of conduit 47 through a plurality of angled jet nozzles 52, all angularly directed to converge inwardly in a downstream direction toward the mixing chamber 34 and formed as holes passing from the interior of hollow jet ring 51 inwardly through the wall of intake conduit 47. A jet supply conduit 53 connects the interior of pressure chamber 33 with the interior of jet ring 51, supplying pressure fluid for jet nozzles 52 which thus provide an agitating, breaking action, jostling the intake material within which the lower end of the intake head 32 is immersed.

In each of the various forms of intake heads 10 and 32 shown in the drawings, the outlet conduit preferably has a gently diverging delivery end 54, tapered to enlarge the cross sectional area of the delivered stream to match that of the conveyor conduit connected to the upper end of intake head 10 or 32.

One indication that the devices of this invention are substantially the opposite of Venturi aspirators is the fact that these devices can be "short-circuited" when too great a pressure drop exists between the supply conduit and the outlet conduit, producing a supply fluid stream entering the mixing chamber at such high velocity that its momentum carries it directly across the mixing chamber and into the exhaust conduit without deceleration sufficiently retarding this stream to create the standing wave phenomenon described above. With such high pressure differentials, these devices lose much of their effectiveness, and accordingly substantial back pressure at the exhaust conduit appears to be desirable. Furthermore, the mixing effectiveness of the intake heads of this invention incorporating the triple feature configuration already described is essentially maximized by particular length-to-diameter ratios of the mixing chamber itself, indicating that this mixing chamber may be "tuned" like an organ pipe to create standing wave phenomena having the wavelengths most desirable for moving particular materials of specific average particle size and specific known densities, as shown in Table A, listing the negative pressures produced at various mixing chamber lengths in small aspirator intake heads having A=0.125" and C=0.750".

TABLE A.—NEGATIVE INTAKE PRESSURES (in Hg) PRODUCED WITH VARIOUS MIXING CHAMBER LENGTHS

| E (in.) | Supply pressure | | | |
|---|---|---|---|---|
| | 40 p.s.i.g. | | 120 p.s.i.g. | |
| | D=0.214" | D=0.250" | D=0.214" | D=0.250" |
| 0.500 | | 21.5 | | 28.7 |
| 0.625 | 22.0 | 22.2 | 24.9 | 24.7 |
| 0.750 | 23.7 | 22.5 | 26.1 | 25.7 |
| 0.800 | 24.1 | 23.1 | 26.0 | 26.1 |
| 0.875 | 14.0 | 17.5 | 26.4 | 26.1 |
| 1.000 | 13.0 | 14.5 | 26.3 | 24.9 |

These variations in negative intake pressures, reaching maximum values at an intermediate mixing chamber length E, tend to confirm the view that resonant "sonic" or "standing wave" phenomena created by the flow of fluids through the mixing chamber play a significant role in maximizing intake negative pressure and the flow rate of intake fluid drawn through the deivce. This is further confirmed by the delivery rates for wheat shown in Table B, observed with different mixing chamber lengths in a fluid mixing device of the type shown in FIGURES 1–4, with A=0.344", D=1.250", and with air supplied to the supply conduit A at 10 p.s.i.g.

TABLE B

Delivery rates in pounds per minute of granular wheat produced with various mixing chamber lengths

| E, inches | Pounds per min. |
|---|---|
| 2.000 | 26.0 |
| 2.125 | 28.0 |
| 2.625 | 21.0 |

The effectiveness of the techniques of this invention are illustrated by the following examples.

Example I

In dredging operations performed on the ocean bottom just off the Florida shore near Jacksonville, a buried sand and coquina shell stratum under 24 feet of sea water was delivered in continuous dredging operations. Six cubic feet per minute or approximately 45 gallons per minute of sea water were pumped through supply conduit 13–14–16 into the intake head 10 of FIGURES 1–4. 300 gallons per minute was delivered through outlet conduit 18, containing from 4 to 8 cubic feet per minute of solid material dredged, depending upon varying densities, thus providing a volume ratio of $$\frac{\text{dredged solids}}{\text{input water}} \text{ between } \frac{2}{3} \text{ and } \frac{4}{3}$$

Example II

In Westport, Connecticut, considerably heavier wet sand located above sea level and having a density of 121.2 pounds per cubic feet was moved by a supply stream of 11.0 gallons per minute of sea water, pumped by a Model No. PP2M ECO Pump driven by a one-fourth HP motor operating at 0.12 BHP at 1725 r.p.m. In lifting the delivered sand 2 feet, 56.5 pounds per minute of sand were delivered. In lifting the delivered sand only one foot, 121.0 pounds per minute of sand were delivered. Thus for pulverized solids of constant density, the quantity delivered varied with the delivery height, providing volume ratios of $$\frac{\text{dredged solids}}{\text{input water}} \text{ between } \frac{1}{3} \text{ and } \frac{2}{3}$$

Example III

At Tammany Parish, Louisiana, a mixture of coarse sand and small gravel was moved by a supply stream of 20 gallons or 2.67 cubic feet of water per minute, lifted eight feet and delivered from a dredging depth 8 feet below water surface and six feet below the bottom, through 25 lateral running feet of fire hose to a delivery point 2 feet above water surface, at a rate of 4.05 cubic feet per minute or about 9.0 cubic yards per hour, an unexpectedly high rate of delivery for dredging operations, at volume ratios of $$\frac{\text{dredged solids}}{\text{input water}} \text{ of about } \frac{3}{2}$$

Example IV

Using an intake head of the type shown in FIGURE 3, fifty pounds of standard extruded chopped polyethylene pellets ⅛" in diameter and ⅜" long having a density of 37.6 pounds per cubic foot were lifted over a height of 3 feet and delivered a lateral distance of about 6 feet using 20 cubic feet per minute of compressed air at only 4.1 p.s.i.g. as a supply stream.

TABLE C.—INTAKE HEAD DIMENSIONS (INCHES) IN EXAMPLES I–IV

| | Example I | II | III | IV |
|---|---|---|---|---|
| A | 0.500 | 0.344 | 0.344 | 0.344 |
| C | 3.068 | 2.062 | 2.062 | 2.062 |
| D | 1.757 | 1.187 | 1.187 | 1.187 |
| E | 4.125 | 3.027 | 3.027 | 3.027 |

Atomizing mixing chamber configurations

Mixing chamber configurations employed in the atomizing methods of this invention have generally the same features as the intake head mixing chambers 11 and 34, as shown in FIGURES 6, 7 and 8.

In the schematic flow diagram shown in FIGURE 6, an atomizing mixing block 60 provided with suitable internal passageways is connected by a supply passage 61 ot a source 62 of pressurized fluid. This pressurized supply fluid is delivered through supply passage 61 to enter mixing block 60 via a supply conduit 63 therein having diameter A.

Supply conduit 63 opens into a mixing chamber 64 having a diameter C substantially larger than supply conduit diameter A. The supply conduit 63 and the mixing chamber 64 are preferably coaxial right circular cylinders. A conical entrance surface 66 preferably joins the end of supply conduit 63 with a cylindrical peripheral surface 67 forming the maximum diameter wall of mixing chamber 64, and this surface 67 extends axially over a distance combining with the axial length of the conical surface 66 to form an overall chamber length E preferably somewhat smaller than the chamber diameter C.

An outlet conduit 68 of diameter D preferably forms a right circular cylinder coaxial with conduit 63 and mixing chamber 64 extends through the center of a substantially transverse exit end wall 69 of mixing chamber 64. Outlet conduit 68 and exit end wall 69 preferably intersect at substantially right angles to form a sharp-edged shoulder 71.

The reduced diameter D of the outlet conduit 68 produces a sharp velocity increase in the advancing fluid stream moving from mixing chamber 64 into outlet conduit 68. This feature appears to provide a significant contribution to the mixing and atomizing effectiveness of the mixing chambers of this invention, minimizing the operating pressures at which successful atomization occurs. The outlet conduit 68 preferably terminates in a flaring exit portal 72, which may be formed with a conical taper of 45 degrees for example, as shown in FIGURE 8, producing a gradual reduction in pressure and velocity in the advancing mixed fluid stream leaving mixing block 10 through the portal 72. When a diverging, wide-angle ejected stream is desired, a flaring adapter horn 72a may be positioned as shown in FIGURE 6, with a small entrance end abutting or spaced closely adjacent to portal 72, and with a larger exit end facing downstream.

The intake function of the apparatus shown in FIGURE 6 is produced by means of an intake conduit 73 in a radial or tangential plane passing through the outer portion of mixing block 60, and entering the mixing chamber 64 preferably through and perpendicular to the conical entrance surface 66 thereof. Intake conduit 73 has a diameter B equal or comparable to the diameter A of the supply conduit 63, and these two conduits preferably converge at an angle of about 30 degrees. If desired, however, the intake conduit 73 may enter mixing chamber 64 through its peripheral surface 67, substantially perpendicular to supply conduit 63.

The passage of fluid through supply conduit 63 entering mixing chamber 64 past the conical entrance surface 66 apparently creates a substantial aspirating force drawing fluid through intake conduit 73 with high efficiency. As shown in FIGURE 6, intake conduit 73 may be connected via an intake passage 74 to a reservoir 76 of intake liquid such as a molten metal or a body of liquid fuel to be atomized.

As shown in the modified schematic flow diagram of FIGURE 7, the mixing block 60 and intake passage 74 may be immersed directly in the reservoir 76, which may then conveniently be heated to bring the body of liquid to be atomized to a predetermined temperature; in this case the body of liquid itself conducts the heat supplied to reservoir 76 to mixing block 60 and intake passage 74, maintaining the ambient temperature of the mixing block 60 and intake passage 74 at nearly the same predetermined temperature as the liquid in reservoir 76. Also as shown in the pressurized fluid source 62 shown in dash lines in FIGURE 7, the supply fluid may be pressurized nitrogen gas conducted from a storage flask 77 via heating coils 78 formed in supply passage 61 to conduct the pressurized supply fluid from flask 77 directly to the supply conduit 63 formed in the block 60.

Fluid ratio adjustments

In the enlarged cross-sectional elevation view of the mixing block shown in FIGURE 8, it will be seen that the intake conduit 73 is connected to intake passage 74 through a lateral passage 79 entering a needle valve passage 81 ending in a valve seat 82 forming the portal of an intake conduit 73, which is extremely short in the embodiment shown in FIGURE 8. A needle valve 83 is slidably or threadedly positioned for longitudinal motion within the needle valve passage 81 from a retracted position beyond the junction of lateral passage 79 with needle valve passage 81 to an extended position in which needle valve 83 is seated upon valve seat 82, entirely blocking the supply of fluid entering through intake conduit 74, lateral passage 79 and intake passage 73. Successive slight retraction movements of needle valve 83 away from this seated position against its valve seat 82 permit successively larger quantities of fluid to be drawn through conduits 74, 79, 81 and 73 into the mixing chamber 64, thus giving excellent control over the ratio of supply fluid to intake fluid, these being the two fluids entering the mixing chamber 64 through conduits 63 and 73 respectively.

In the device shown in FIGURE 8, the outlet conduit 68 of substantially uniform diameter is formed in a concentric exit sleeve 80 held by brazing, swaging or a force fit within the outer portion of the cylindrical peripheral wall surface 67 of mixing chamber 64. In this embodiment, used successfully in fuel atomization tests, the following dimensions were employed:

|   | Inch |
|---|---|
| A | 0.0625 |
| B | 0.0500 |
| C | 0.2500 |
| D | 0.0860 |
| E | 0.1630 |

In addition, in the device shown in FIGURE 8, the supply conduit 63 and the intake conduit 73 converged at the preferred angle of 30 degrees, and the conical entrance surface 66 was formed by revolution of a generatrix line angularly displaced 60 degrees from the common axis of the device, as in the mixing chamber 34 shown in FIGURE 5.

If desired, two or more intake conduits may enter chamber 64 to introduce a plurality of intake fluids, or to introduce the same intake fluid from plural directions.

In forming solidified particles of powdered metals, alloys of compounds from one or more fluids, it has been discovered that if the supply fluid is pressurized nitrogen gas or steam entering supply conduit 63 at a temperature lower than the temperature of the molten metal entering the mixing chamber 64 through intake conduit 73, the consequent rapid cooling of the atomized molten metal generally produces irregular shaped particles.

By contrast, if the supply fluid is steam or pressurized nitrogen entering the supply conduit 63 at a temperature substantially higher than the temperature of the molten metal entering through intake conduit 73, the resulting heating of the atomized molten metal by the supply fluid tends to produce atomized fluid particles having ample time for surface tension smoothing of their outer surfaces, giving smooth, round regular particles of uniform, fine particle size. By supplying heat to the exhaust zone 84 into which exit portal 72 opens, and particularly by forming this zone 84 in an elongated, vertical drop-tower configuration as indicated in FIGURE 7, the atomized molten metal droplets can have ample time to assume smooth, round shapes during their slow solidification as they descend through the heated drop tower 84.

Example V

A block of Cerro Corporation "Cerrocast" lead alloy with a melting point of about 200° F. was melted and held at a temperature of 250° F. and then drawn through intake conduit 73 into a mixing chamber 64, with compressed air being supplied at a temperature of 310° F. and a pressure of 22 p.s.i.g. through supply conduit 63. The following particle size distribution was observed with standard Tyler screens, disregarding fine dust lost to the atmosphere:

|   | Grams |
|---|---|
| Greater than 50 mesh | 1.65 |
| Between 50 mesh and 100 mesh | 3.15 |
| Between 100 mesh and 200 mesh | 4.55 |
| Finer than 200 mesh | 10.35 |
| Total | 19.70 |

Fuel atomization.—Example VI

In fuel atomization tests conducted in a fuel burner with the mixing block configuration illustrated in FIGURE 8 unusually effective atomization was observed. In these tests an oil burner employing 1.1 gallons per hour was observed to operate with a highly efficient "white" flame, with no blow-outs, and with operation continuing for 2½ hours of uninterrupted service. The carbon dioxide content of the stack gas was extremely low, and no forced draft was required. No soot whatever was observed to be formed by the fuel combustion during the entire test. The adjustable needle valve 83 permits excellent metering control of liquid fuel and no fuel pump or positive fuel delivery system is required.

While the objects of the invention are efficiently achieved by the preferred forms of the invention described in the foregoing specification, the invention also includes changes and variations falling within and between the definitions of the following claims.

We claim:

1. The method of moving and mixing an intake fluid stream into a supply fluid stream comprising the steps of:
    (A) directing a moving stream of a supply fluid through a supply conduit into an enlarged mixing chamber near an intake portal formed therein,
    (B) exposing the intake portal to the intake fluid to admit the intake fluid to the mixing chamber,
    (C) and conducting the resulting mixed stream of supply fluid and intake fluid past an exit surface joining the periphery of the enlarged mixing chamber to a portal end of an outlet conduit, with the outlet conduit having a smaller cross sectional area than the chamber and forming therewith a zone of abrupt reduction of diameter of the mixed stream of fluid entering the outlet conduit, whereby the intake fluid is mixed into and distributed throughout the supply fluid passing through the outlet conduit.

2. The method defined in claim 1 wherein the supply fluid is a gas, whereby the intake fluid is finely atomized in the supply fluid in the mixed stream passing through the outlet conduit.

3. The method defined in claim 1 wherein the intake fluid is delivered to the mixing chamber via an intake conduit, and in which the supply conduit and the intake conduit converge at an acute angle and are both substantially smaller than the mixing chamber.

4. A device for moving and mixing a stream of intake fluid into an advancing stream of supply fluid comprising, in combination:
    (A) means forming an enlarged, unobstructed mixing chamber,
    (B) supply conduit means positioned to deliver supply fluid under pressure from a source thereof into an intake end of the mixing chamber, (C) means forming an intake portal in the intake end of the mixing chamber closely adjacent to the supply conduit means, (D) an outlet conduit means connected to the mixing chamber opposite its intake end by means forming an exit surface joining the periphery of the enlarged unobstructed mixing chamber to a portal end of the outlet conduit means, (E) with both the supply conduit means and the outlet conduit means having a cross sectional area substantially less than that of the mixing chamber, (F) and with the outlet conduit means and the exit surface means forming bounding surfaces constricting the mixed stream at a zone of abrupt reduction of diameter as it enters the outlet conduit means.

5. The device defined in claim 4 wherein the intake portal surrounds the supply conduit at the intake end of the mixing chamber.

6. The device defined in claim 4 wherein the intake portal is positioned at the remote end of intake conduit means opening into the intake end of the mixing chamber.

7. The device defined in claim 6 wherein the supply conduit means and the intake conduit means converge at an acute angle, with their respective axes intersecting within the mixing chamber.

8. The device defined in claim 6 including a fluid reservoir positioned to hold a quantity of intake fluid with the intake portal immersed therein, and heating means positioned to heat the intake fluid reservoir to a temperature above the melting point of the intake fluid.

9. The device defined in claim 8 wherein the reservoir surrounds a mixing block in which the three conduit means and the mixing chamber are all formed, thereby maintaining all fluid-containing surfaces at predetermined temperatures.

10. The device defined in claim 6 wherein the intake conduit is provided with an adjustable valve to vary the ratio of supply fluid and intake fluid passing through the mixing chamber.

11. The device defined in claim 4 including a plurality of nozzles positioned to direct a fluid under pressure toward the region beyond the supply conduit, and means connecting the nozzles to a source of fluid under pressure.

12. The device defined in claim 4 including a plurality of nozzles positioned to direct a fluid under pressure toward the region surrounding the intake portal.

13. The device defined in claim 4 wherein the outlet conduit means is connected to the mixing chamber through a transverse exit surface with which it forms a sharp-edged exit portal.

14. The device defined in claim 13 wherein the exit surface and the outlet conduit means are substantially perpendicular.

15. The device defined in claim 4 wherein the supply conduit means, the outlet conduit means and the mixing chamber are all cylindrical in shape and co-axially aligned.

16. The device defined in claim 4 wherein the outlet conduit means terminates in a flaring diverging horn serving to spread the mixed fluid streams in a diverging mass.

17. The device defined in claim 4 including means forming a temperature-controlled exhaust zone positioned to receive the mixed fluid streams delivered through the outlet conduit means.

18. The combination defined in claim 4 including support means secured to the mixing chamber means for suspending the device with its intake portal immersed in a body of solid granular material in the intake fluid.

References Cited

UNITED STATES PATENTS

| | | | |
|---|---|---|---|
| 2,563,002 | 8/1951 | Bissell et al. | 259—4 |
| 2,582,198 | 1/1952 | Etheridge | 259—95 X |
| 2,992,084 | 7/1961 | Schropp | 259—4 X |
| 3,166,020 | 1/1965 | Cook | 259—95 X |

ROBERT W. JENKINS, *Primary Examiner.*

UNITED STATES PATENT OFFICE
CERTIFICATE OF CORRECTION

Patent No. 3,434,698                      March 25, 1969

Millard F. Smith et al.

It is certified that error appears in the above identified patent and that said Letters Patent are hereby corrected as shown below:

Column 1, line 38, "atomozing" should read -- atomizing --. Column 2, line 40, "relaying" should read -- relying --. Column 6, TABLE A, fifth column, line 1 thereof, "28.7" should read -- 23.7 --. Column 8, line 9, "ot" should read -- to --.

Signed and sealed this 21st day of April 1970.

(SEAL)
Attest:

Edward M. Fletcher, Jr.                   WILLIAM E. SCHUYLER, JR.
Attesting Officer                          Commissioner of Patents